| SIGNED TERNARY NOTATION | | | | DECIMAL | CONVENTIONAL TERNARY NOTATION | | | |
|---|---|---|---|---|---|---|---|---|
| $3^3 = 27$ | $3^2 = 9$ | $3^1 = 3$ | $3^0 = 1$ | $10^0 = 1$ | $3^3 = 27$ | $3^2 = 9$ | $3^1 = 3$ | $3^0 = 1$ |
| 0 | 0 | 0 | 0 | 0 | 0 | 0 | 0 | 0 |
| 0 | 0 | 0 | +1 | 1 | 0 | 0 | 0 | 1 |
| 0 | 0 | +1 | −1 | 2 | 0 | 0 | 0 | 2 |
| 0 | 0 | +1 | 0 | 3 | 0 | 0 | 1 | 0 |
| 0 | 0 | +1 | +1 | 4 | 0 | 0 | 1 | 1 |
| 0 | +1 | −1 | −1 | 5 | 0 | 0 | 1 | 2 |
| 0 | +1 | −1 | 0 | 6 | 0 | 0 | 2 | 0 |
| 0 | +1 | −1 | +1 | 7 | 0 | 0 | 2 | 1 |
| 0 | +1 | 0 | −1 | 8 | 0 | 0 | 2 | 2 |
| 0 | +1 | 0 | 0 | 9 | 0 | 1 | 0 | 0 |
Fig. 1
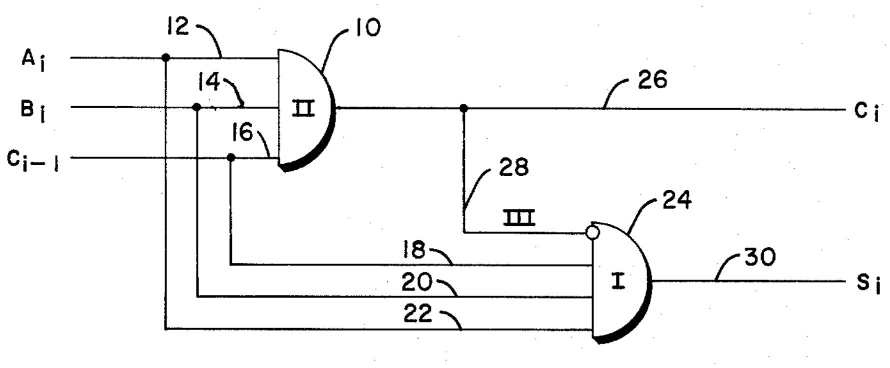
Fig. 2
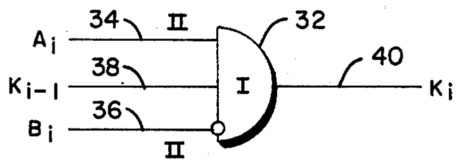
Fig. 3
INVENTOR
WILLIAM H. HANSON
BY Marvin Jacobson
ATTORNEY

| $C_{i-1}$ | $A_i$ | $B_i$ | $S_i$ | $C_i$ |
|---|---|---|---|---|
| 0 | 0 | 0 | 0 | 0 |
| 0 | 0 | +1 | +1 | 0 |
| 0 | 0 | −1 | −1 | 0 |
| 0 | +1 | 0 | +1 | 0 |
| 0 | +1 | +1 | −1 | +1 |
| 0 | +1 | −1 | 0 | 0 |
| 0 | −1 | 0 | −1 | 0 |
| 0 | −1 | +1 | 0 | 0 |
| 0 | −1 | −1 | +1 | −1 |
| +1 | 0 | 0 | +1 | 0 |
| +1 | 0 | +1 | −1 | +1 |
| +1 | 0 | −1 | 0 | 0 |
| +1 | +1 | 0 | −1 | +1 |
| +1 | +1 | +1 | 0 | +1 |
| +1 | +1 | −1 | +1 | 0 |
| +1 | −1 | 0 | 0 | 0 |
| +1 | −1 | +1 | +1 | 0 |
| +1 | −1 | −1 | −1 | 0 |
| −1 | 0 | 0 | −1 | 0 |
| −1 | 0 | +1 | 0 | 0 |
| −1 | 0 | −1 | +1 | −1 |
| −1 | +1 | 0 | 0 | 0 |
| −1 | +1 | +1 | +1 | 0 |
| −1 | +1 | −1 | −1 | 0 |
| −1 | −1 | 0 | +1 | −1 |
| −1 | −1 | +1 | −1 | 0 |
| −1 | −1 | −1 | 0 | −1 |

| $K_{i-1}$ | | $A_i$ | | $B_i$ | | $K_i$ | |
|---|---|---|---|---|---|---|---|
| ST | CT | ST | CT | ST | CT | ST | CT |
| 0 | 1 | 0 | 1 | 0 | 1 | 0 | 1 |
| 0 | 1 | 0 | 1 | +1 | 2 | −1 | 0 |
| 0 | 1 | 0 | 1 | −1 | 0 | +1 | 2 |
| 0 | 1 | +1 | 2 | 0 | 1 | +1 | 2 |
| 0 | 1 | +1 | 2 | +1 | 2 | 0 | 1 |
| 0 | 1 | +1 | 2 | −1 | 0 | +1 | 2 |
| 0 | 1 | −1 | 0 | 0 | 1 | −1 | 0 |
| 0 | 1 | −1 | 0 | +1 | 2 | −1 | 0 |
| 0 | 1 | −1 | 0 | −1 | 0 | 0 | 1 |
| +1 | 2 | 0 | 1 | 0 | 1 | +1 | 2 |
| +1 | 2 | 0 | 1 | +1 | 2 | −1 | 0 |
| +1 | 2 | 0 | 1 | −1 | 0 | +1 | 2 |
| +1 | 2 | +1 | 2 | 0 | 1 | +1 | 2 |
| +1 | 2 | +1 | 2 | +1 | 2 | +1 | 2 |
| +1 | 2 | +1 | 2 | −1 | 0 | +1 | 2 |
| +1 | 2 | −1 | 0 | 0 | 1 | −1 | 0 |
| +1 | 2 | −1 | 0 | +1 | 2 | −1 | 0 |
| +1 | 2 | −1 | 0 | −1 | 0 | +1 | 2 |
| −1 | 0 | 0 | 1 | 0 | 1 | −1 | 0 |
| −1 | 0 | 0 | 1 | +1 | 2 | −1 | 0 |
| −1 | 0 | 0 | 1 | −1 | 0 | +1 | 2 |
| −1 | 0 | +1 | 2 | 0 | 1 | +1 | 2 |
| −1 | 0 | +1 | 2 | +1 | 2 | −1 | 0 |
| −1 | 0 | +1 | 2 | −1 | 0 | +1 | 2 |
| −1 | 0 | −1 | 0 | 0 | 1 | −1 | 0 |
| −1 | 0 | −1 | 0 | +1 | 2 | −1 | 0 |
| −1 | 0 | −1 | 0 | −1 | 0 | −1 | 0 |

| NEGATION | | | |
|---|---|---|---|
| SIGNED TERNARY | | CONVENTIONAL TERNARY | |
| X | $\overline{X}$ | X | $\overline{X}$ |
| 0 | 0 | 1 | 1 |
| +1 | −1 | 2 | 0 |
| −1 | +1 | 0 | 2 |

United States Patent Office 3,210,529

Patented Oct. 5, 1965

3,210,529
DIGITAL ADDER AND COMPARATOR CIRCUITS EMPLOYING TERNARY LOGIC ELEMENTS

William H. Hanson, Minneapolis, Minn., assignor to Sperry Rand Corporation, New York, N.Y., a corporation of Delaware Filed Aug. 29, 1962, Ser. No. 220,183
2 Claims. (Cl. 235—176)

This invention relates to logical circuits for operating on ternary numbers. More particularly, the invention is directed toward apparatus for performing arithmetic operations on signed ternary numbers as well as conventional ternary numbers.

Prior to entering into description of the instant invention, an explanation of a particular numbering system, signed ternary, with which this invention deals in part, is of importance. The particular numbering notation can best be understood by comparison to the conventional ternary notation, both in relationship to the decimal system. The center column of the table of FIG. 1 lists the decimal digits 0 through 9 and to the left of the decimal column is the equivalent signed ternary value while to the right of the decimal column is listed the equivalent conventional ternary value. It should be noted that the three possible values for each digit of conventional ternary are 0, 1, and 2, whereas in the signed ternary notation the three possible values are 0, +1, and −1. Although the difference between the two numbering systems should be obvious from the table, it may be worthwhile to point out one particular example. Referring to the third line of the FIG. 1 table, the equivalent of decimal 2 is expressed as 00+1−1 in signed ternary notation and as 0002 in the conventional ternary notation. The conversion from conventional ternary to decimal is accomplished in the well known manner of multiplying the coefficient for each digit order by the radix raised to the corresponding digit order power and adding all of the results. For conversion to decimal of numbers designated in the signed ternary notation, the steps are the same, however, it should be noted that the algebraic sums require some subtractions. The signed ternary number 00+1−1 is equated to decimal two by algebraically combining +3 with −1. A further difference of the two ternary numbering systems is pointed out in the table by considering addition of 1 and 1. In the conventional ternary notation adding 1 to the lowest-order digit 1 results in a 2 in said lowest digit order position so that a carry need not be developed for the next higher order. In the signed ternary notation the addition of 1 to the lowest-order position, which is in the +1 condition, results in a −1 in the lowest digit order position and a +1 in the next higher-order digit position which indicates that a carry had to be developed for the next higher-order digit position as a result of the addition at the lowest-order digit position.

It is a general object of this invention to provide logical circuits for performing arithmetic operations on ternary quantities.

One embodiment of this invention, which will be subsequently described in detail, is a full adder stage for signed ternary numbers. Under the conventional ternary notation system the limited prior art full-adder stage includes two tristable logical circuit elements for developing a sum and additional tristable elements, up to five of them, for developing the carry. This invention provides a full-adder stage comprising only two tristable logical circuit elements for developing both the sum and the carry. This then provides the means for substituting the signed ternary notation numbering system for the conventional ternary system to achieve the same arithmetic sum with an adder, with a resulting substantial savings in hardware.

A second embodiment of this invention is a tristable logical circuit element for a comparator stage for comparing two ternary numbers whether they be of the conventional ternary notation or the signed ternary notation. The output signal representation of the comparator, comprising one element for each pair of corresponding digit orders of the numbers to be compared, is a signal indication of greater than, less than, or equal to.

These and other more detailed and specific objects and features will be disclosed in the course of the following specification, reference being had to the accompanying drawings, in which:

FIG. 1 is a table comparing ternary notations to decimal;

FIG. 2 is a logical diagram for a full-adder stage for signed ternary numbers;

FIG. 3 is a logical diagram of a comparator stage for ternary numbers;

Figures 4, 5, 6, 7:
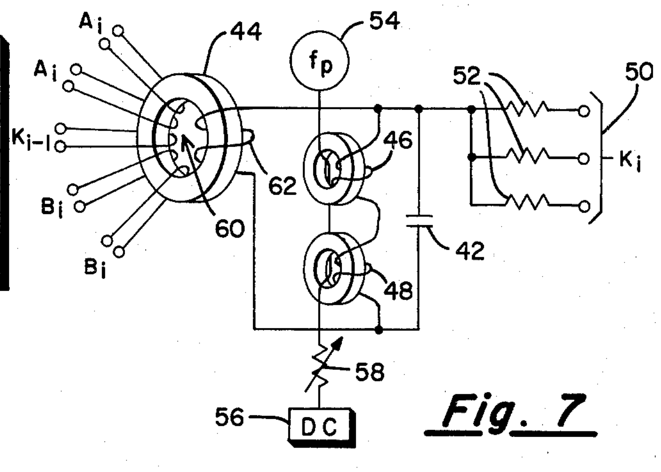
FIG. 4 is the truth table for the logical circuit of FIG. 2.
FIG. 5 is the truth table for logical circuit of FIG. 3.
FIG. 6 is a table defining negate or complement.
FIG. 7 is a schematic diagram of an illustrative circuit which can be utilized as a comparator stage.

The symbology used in the logic circuit diagrams of FIGS. 2 and 3 will now be defined. The D-shaped blocks represent tristable state logical elements with the input lines thereto coupled at the straight edge and the output line appearing at the curved portion. These tristable devices are preferably parametrons and illustrative circuitry will be subsequently described in greater detail in relation to the FIG. 7. A circular symbol appearing at the input side of the element indicates that the negate or complement of the signal appearing on the line utilized by the logical element, either by receiving a negate input or by performing negation internally. As used in the specification and the claims, the terms negate and complement are synonymous and are defined by the table of FIG. 5. The Roman numeral appearing adjacent an input line designates the total number of said inputs that are utilized by the associated element. For example, the Roman numeral III, shown adjacent the negate input to one of the logical elements of FIG. 2, indicates that there are actually three identical inputs applied to said element but all three are represented by a single input line. Alternatively, a single input can be applied while internal arrangement of the logical element gives it the effect of three inputs. In conjunction therewith, it can be stated that the particular associated input has a weight of three. Where there is no number designation adjacent an input line it can be assumed that this is a single input and therefore has a weight of one. The Roman numeral contained within the logical element symbol represents the threshold value, *t*, of the particular logical element. Considering then these elements as ternary threshold elements, each can accept one or more inputs with each of the inputs capable of having any one of three discrete values for example as representing the numbers 0, +1, and −1 in the signed ternary notation. The threshold, *t*, must fall within the range $1 \leqslant +\Sigma N$, where N is the total number of inputs to the element. Using the exemplary values of −1, 0, and +1, the output of an element can be determined by pairing each +1 input with each −1 input to balance each other to zero until the pairs are exhausted. If any unpaired non-zero input remains, they all must therefore have the same value. If the number of the remaining unpaired non-zero inputs is equal to or greater than *t*, the output of the element has the same value as these inputs. If the number of remaining unpaired non-zero inputs is less than *t*, the output of the element is zero.

Although throughout the specification the invention will be described utilizing signed ternary values of +1, −1, and 0, and conventional ternary value of 0, 1, and 2, it should be understood that this is intended to mean signal representations of the respective values; illustrative signal representations will be more fully described in relation to the circuitry of FIG. 7, which is utilizable as the circuit of a logical element.

In the general form, the output Y of a logical element of threshold $t$ having N inputs, $X_1, X_2 \ldots X_N$ can be represented in logical equation form by (a) $$Y = X_1^t X_2^t \ldots X_N$$

It should be further noted that the negate of an input is represented in the well known fashion by a bar symbol over the associated letter designation.

Referring now to the logical circuit diagram of FIG. 2, there is shown the two element stage for a full adder for signed ternary numbers. The logical element 10 is a threshold-two element having three inputs $A_i$, $B_i$, and $C_{i-1}$ respectively applied at input lines 12, 14, and 16. The same three inputs are also applied respectively to input lines 18, 20, and 22 of the threshold-one element 24. The letter designations given to said three inputs correspond respectively to the signed ternary value of the $i^{th}$ digit order of the augend and addend, A and B respectively, and a signed ternary value for the carry developed as a result of an addition of corresponding digit orders of the next lower digit order. The output of logical element 10, appearing at line 26, is labeled $C_i$ indicating that it carries the signed ternary value for the carry emanating from the $i^{th}$ digit order stage of the adder. The same signal output which represents the developed carry $C_i$ is applied as a negate input signal with weight three to the input of element 24 via line 28. The output from element 24 appearing on output line 30 labeled $S_i$ represents the signed ternary value of the sum resulting from the full add of the $i^{th}$ digit orders of the augend and addend.

Substituting in the general expression of the logical equation for the ternary threshold element, as shown by (a), the output signal, $C_i$, from element 10 can be expressed as, (b) $$C_i = A_i^2 B_i^2 C_{i-1}$$

and the output of element 24, $S_i$, can be expressed as, (c) $$S_i = A_i^1 B_i^1 C_{i-1}^1 \overline{C}_i^1 \overline{C}_i^1 \overline{C}_i$$

Using signed ternary values for $A_i$, $B_i$, and $C_{i-1}$, it can be seen that the respective output signals $C_i$ and $S_i$ developed from the two corresponding ternary threshold elements, 10 and 24, will be one of the twenty-seven possible combinations shown in the truth table of FIG. 4. For example, the addition of decimal 2 to decimal 4 will give a resulting sum of decimal 6. In signed ternary notation the addend would be 00+1−1 and the augend would be 00+1+1. Considering the lowest digit order of the addend to be $A_0$ and the corresponding digit order of the augend to be $B_0$ it can be seen that by substituting in (b), the respectively corresponding ternary values of −1 and +1 and 0 for $A_0$, $B_0$, and $C_{0-1}$, the output of logical element 10, which is $C_0$, will be 0. Obviously the term $C_{0-1}$ is a special case since there can be no carry into the lowest digit order position (neglecting possible end-around carries) so the value of $C_{0-1}$ will always be 0. Substituting the respectively corresponding values into the logical equation for element 24, (c), the output therefrom being $S_0$ will also be 0. The step-by-step proof follows:

Substituting values in (b), $$C_0 = -1^2 + 1^2 0$$

Since −1 and +1 balance each other to zero, in accord with the previously stated rules, $C_0 = 0$.

Substituting values in (c), $$S_0 = -1^1 + 1^1 0^1 \overline{0}^1 \overline{0}^1 \overline{0}$$

Since the negate table of FIG. 6 specifies that the negate or complement of 0 is 0, −1 and +1 balance each other to zero so that $S_0 = 0$.

The foregoing is in accord with the conditions shown in line eight of the table of FIG. 4. Going to the next higher order addition wherein the addend is +1 and the augend is +1 with a 0 carry, the output of logical element 10, corresponding to $C_1$, is a +1 and the output of output logical element 24, corresponding to $S_1$, is a value of −1 which is in accord with the condition shown in line five of the truth table of FIG. 4. Continuing through the third lowest digit order of the respectively corresponding signed ternary numbers being added together, with the augend of 0, the addend of 0 and a carry of +1, the resulting carry and sum are respectively 0 and +1, which is in accord with the conditions shown on line ten of the table of FIG. 4. The resulting answer of 0+1−10 which is the signed ternary value number for decimal 6 occurs as the final sum of the addition.

The effect of the threshold requirement is pointed out by reference to line fifteen of the table of FIG. 4 which lists $$C_{i-1} = +1, \quad A_i = +1 \text{ and } B_i = -1$$

Substituting these values in Equation b $$C_i = +1^2 - 1^2 + 1$$

The +1 and −1 balance to zero to leave a balance of +1. However, since the threshold is 2 and only a single +1 remains, under the stated rules $C_i$ will equal 0.

Referring now to FIG. 3, there is shown a logical circuit diagram of a single stage for a comparator for comparing two ternary numbers, A and B. The comparator, in general, would comprise a plurality of identical stages connected in tandem with the number of stages being equal to the number of digit orders to be compared. Since all stages are identical, only one is shown and from the following detailed description the operation of the entire comparator is readily understood. The single threshold logical circuit element 32, corresponding to the $i^{th}$ stage of the comparator, receives a first input of weight two via line 34, a second negate input of weight two via line 36, a third input of weight one via line 38, and provides an output in response to said inputs on line 40. The input lines 34 and 36 are respectively label $A_i$ and $B_i$ to indicate that they carry a signal indication of the ternary value of the respectively corresponding $i^{th}$ digit orders of the two numbers A and B which are to be compared. The input line 38 is labeled $K_{i-1}$ to indicate that it provides as an input to logical element 32 the resulting signal output representation of a ternary value from the next lower order stage or logical element of the comparator. The output line 40 is labeled $K_i$ to indicate that it carries the ternary value signal result of the comparison of the two numbers, A and B, through the $i^{th}$ digit order. For illustrative purposes the result of the comparison of the numbers A and B through the $i^{th}$ position is given by $K_i$ as follows:

If A is less than B, $K_i$ equals −1;
If A is equal to B, $K_i$ equals 0;
If A is greater than B, $K_i$ equals +1.

Under the general expression (a) it can be seen that the logical equation for the logical circuit of FIG. 3 is represented by the following;

(d) $$K_i = A_i^1 A_i^1 \overline{B}_i^1 \overline{B}_i^1 K_{i-1}$$

Referring to the truth table of FIG. 5 there is listed the signed ternary (ST) and the conventional ternary (CT) valued output signals, $K_i$, indicating the result of the comparison of the two numbers A and B through the $i^{th}$ digit order resulting from all of the possible combination of input signals to the $i^{th}$ stage of the comparator. Taking the top row of signed ternary values in the table in FIG. 5 and substituting them in (d), $$K_i = 0^1 0^1 \overline{0}^1 \overline{0}^1 0$$

which results in $K_i=0$ which is in accord with the result shown for $K_i$ in the table. In words, $K_{i-1}$ being equal to zero indicates that the numbers A and B up to the $i^{th}$ order digits are equal and since $A_i$ and $B_i$ are both equal to zero the comparison through the $i^{th}$ order digit provides a signal output of zero indicating the A is equal to B through the $i^{th}$ digit order. Referring to the bottom row of signed ternary values for $K_{i-1}$, $A_i$ and $B_i$ and substituting them in the equation results in $K_i=-1$ indicating that through the $i^{th}$ bit A is less than B.

It should be noted that the logical circuit of FIG. 3 along with the truth table of FIG. 5 is equally applicable to conventional ternary numbers. The conventional ternary values of 0, 1 and 2 can be considered as corresponding respectively to the signed ternary values $-1$, 0 and $+1$ for use in the comparator. In the table of FIG. 5, the conventional ternary value corresponding to each of the signed ternary values is listed in each of the columns. As described immediately above in relation to the use of signed ternary values the conventional ternary values can be substituted in the logical equation in a similar manner to show how the proper signal values are obtained to indicate the results of the comparison. It should be kept in mind that the same rules applicable to signed ternary values apply to the corresponding conventional ternary values. This means then that in conventional ternary notation a value of 2 is balanced by 0 to a 1 and, as shown in the negation table of FIG. 6, the negate of 2 is 0, the negate of 0 is 2, and the negate of 1 is 1. Furthermore, as a corollary to the rule for signed ternary notation, the output of the logical element can be determined by pairing each 2 input with each 0 input to balance each other to 1 until all the pairs are exhausted. If unpaired non-one inputs remain, they all must be of the same value and if the quantity of the latter is equal to or greater than $t$ (in this instance $t=1$) the output of the element is the same value as the inputs. Otherwise the output is 1.

As an illustrative example, using the values shown in the sixth from the bottom line of the table of FIG. 5 (indicated by the arrow) of $$A_i=2,\ B_i=1 \text{ and } K_{i-1}=0$$

and substituting these values in (d)

$$K_i=2^1 2^1 \bar{1}^1 \bar{1}^1 0$$

One of the 2's is balanced by the 0 and since the negate of 1 is 1, the remaining non-one value is 2 so $K_i=2$, which is in accord with the table. This indicates that through the $i^{th}$ digit order, A is greater than B.

FIG. 7 is a schematic diagram of an illustrative tristable parametron which can be utilized for the circuitry of the logical circuit of FIG. 3 to perform the truth table function of FIG. 5. It should be understood that this circuit is only illustrative and that the type of tristable circuit is a matter of choice and design. In the circuit of FIG. 7 capacitor 42 in combination with the parallel connected windings of input transformer 44 and the clock frequency input windings 46 and 48 forms a parallel resonant circuit. Output signals from the parametron appear at output terminals which are collectively shown as 50 which are connected to one side of the parallel tuned circuit via resistors 52. Energy from the clock frequency source 54 is coupled to the parallel resonant circuit via the two windings 46 and 48 and serially connected with the input winding to said latter windings is a bias source comprising a D.C. voltage source 56 and a variable resistor 58. Input signals are applied to the parametron through the input windings shown collectively at 60 with each of the five input windings having the same number of turns. Referring back to FIG. 3, in conjunction with FIG. 7, it can be seen that the input signal $A_i$ having a weight of two is achieved by allocating two of the input windings 60, which are wound to phase or additive, for receiving said latter input signal. The $B_i$ input signal of weight two is achieved by applying said latter input signal to two of the input windings, however, the negate of this latter input signal is achieved by the windings being counterwound with relation to the other windings. The signal which is then applied to the tuned circuit by the secondary winding 62 of the transformer 44 is then a combination of the three input signals and is in accord with the weight and value of said input signals. It can be seen then that in the illustrative circuitry the weight is effected by the number of equal-turn windings to which the signal is applied. Obviously, the weight factor can be achieved by using a single winding with the proper turns ratio with respect to non-weighted windings.

Since the operation of parametric devices is presently well known in the art and since the circuitry shown in FIG. 7 is only intended to be illustrative, no detailed explanation of the operation of said circuitry will be undertaken here, however, the essential features will be briefly described. In response to an exciting signal of predetermined frequency and dependent upon the input signals applied, the circuitry will oscillate to provide an output signal of one of two frequencies which differ from one another in phase relationship by $\pi$ radians or 180°. That is, with regard to some reference, the A.C. output signal of the parametric circuit of FIG. 7 will be of a frequency having one of two phases. These represent two of the stable operational states. The third state occurs when there is no oscillation so that substantially no A.C. signal appears at the output. Each of the three output signals can then be arbitrarily assigned a signed and corresponding conventional ternary value. The threshold, $t$, of the circuit is set by the biasing arrangement including the D.C. voltage source 56 and the variable resistor 58 to provide a D.C. current which is magnetically coupled to the core of windings 46 and 48 to a degree such that a predetermined amount of input signal must be applied to cause oscillation of the resonant circuit.

From the circuit of FIG. 7 along with the brief description immediately above, it is obvious that a plurality of said circuits can be connected in a tandem arrangement to form a multi-stage comparator for comparing two multi-digit ternary numbers. An output terminal from one of the stages would be connected to the $K_{i-1}$ input winding of the next higher order stage and the respectively corresponding digit order values of the two numbers, A and B, would be applied to their corresponding input windings. Furthermore, it will be obvious to one of ordinary mechanical skill how the circuit of FIG. 7 can be modified to operate as a three single-weight input logical circuit element having a threshold of two, such as element 10 in FIG. 2, or as a logical element having three single-weight inputs and a negate three-weight input with a threshold of one, such as element 24 in FIG. 2.

It is understood that suitable modifications may be made in the structure as disclosed provided such modifications come within the spirit and scope of the appended claims. Having now, therefore, fully illustrated and described my invention, what I claim to be new and desire to protect by Letters Patent is:

What is claimed is:

1. A ternary comparator stage for generating a ternary valued signal $K_i$ representative of a comparison through the $i^{th}$ digit order of two ternary numbers of the form $A_{n-1} \ldots A_i \ldots A_1A_0$ and $B_{n-1} \ldots B_i \ldots B_1B_0$ where $0 \leqslant i \leqslant n-1$, comprising;

input means for receiving ternary valued signal representations of $A_i$, $B_i$, and $K_{i-1}$ the latter being representative of the result of a comparison of all lower digit orders, means coupled to said input means for generating a ternary valued output signal representative of $K_i$ in accordance with the logical function $$K_i=A_i^1 A_i^1 \overline{B}_i^1 \overline{B}_i^1 K_{i-1}$$

said generating means comprising a ternary threshold logic element having an effective threshold value of one and wherein said signal representation of $A_i$ is effectively weighted by a factor of two, said signal representation of $B_i$ is inverted and effectively weighted by a factor of two, and said signal representation of $K_{i-1}$ is effectively weighted by a factor of one.

2. A signed ternary full adder stage for generating ternary valued signals $C_i$ and $S_i$ representative of the signed ternary carry and sum respectively of the $i^{th}$ digit order of two signed ternary numbers of the form $$A_{n-1} \ldots A_i \ldots A_1 A_0 \text{ and } B_{n-1} \ldots B_i \ldots B_1 B_0$$

where $0 \leqslant i \leqslant n-1$, comprising input means for receiving ternary valued signal representations of $A_i$, $B_i$, and $C_{i-1}$ the latter being representative of the signed ternary carry of the next lower digit order, first means coupled to said input means for utilizing said ternary valued input signals to generate a ternary valued output signal representative of $C_i$ in the signed ternary number system and in accordance with the logical function $$C_i = A_i^2 B_i^2 C_{i-1}$$

said first generating means comprising a ternary threshold logic element having an effective threshold value of two and wherein each of said ternary valued input signal representations is effectively weighted by a factor of one, second means coupled to said input means and said first generating means for utilizing said ternary valued input signals and said ternary valued carry signal to generate a ternary valued output signal representative of $S_i$ in the signed ternary number system and in accordance with the logical function $$S_i = A_i^1 B_i^1 C_{i-1}^1 \overline{C}_i^1 \overline{C}_i^1 \overline{C}_i$$

said second generating means comprising a ternary threshold logic element having an effective threshold of one and wherein each of said ternary valued input signal representations is effectively weighted by a factor of one and said ternary valued carry signal representation is inverted and effectively weighted by a factor of three, each of said ternary valued signal representations corresponding to one member of the signed ternary number set composed of $-1$, 0 and 1.

References Cited by the Examiner

UNITED STATES PATENTS

| | | | |
|---|---|---|---|
| 2,921,737 | 1/60 | Mao Chao Chen | 235—176 |
| 3,028,088 | 4/62 | Dunham | 235—176 |

OTHER REFERENCES

Engineering Research Associates, High Speed Computing Devices, McGraw-Hill Book Co., 1950.

Schauer: "Some Applications of Magnetic Film Parametrons as Logical Devices," IRE Transactions on Electronic Computers, EC8–9, 1959–1960, TK 7885 A112, pages 315–320.

ROBERT C. BAILEY, *Primary Examiner.*

MALCOLM A. MORRISON, *Examiner.*